E. S. HEMMENWAY.
WAVE MOTOR.
APPLICATION FILED NOV. 10, 1911.

1,082,746.

Patented Dec. 30, 1913.

Witnesses
Agnes M. Shea
Ida A. Eichorn

Inventor
Eugene S. Hemmenway
by George A. Rockwell,
Attorney

E. S. HEMMENWAY.
WAVE MOTOR.
APPLICATION FILED NOV. 10, 1911.

1,082,746.

Patented Dec. 30, 1913.
9 SHEETS—SHEET 3.

E. S. HEMMENWAY.
WAVE MOTOR.
APPLICATION FILED NOV. 10, 1911.

1,082,746.

Patented Dec. 30, 1913.
9 SHEETS—SHEET 5.

Witnesses
Ida A. Eichom.
Agnes M. Shea.

Inventor
Eugene S. Hemmenway
by George A. Rockwell
attorney.

E. S. HEMMENWAY.
WAVE MOTOR.
APPLICATION FILED NOV. 10, 1911.

1,082,746.

Patented Dec. 30, 1913.
9 SHEETS—SHEET 7.

Witnesses:
Ida A. Eichorn.
Agnes M. Shea.

Inventor
Eugene S. Hemmenway
by George A. Rockwell,
attorney.

E. S. HEMMENWAY.
WAVE MOTOR.
APPLICATION FILED NOV. 10, 1911.

1,082,746.

Patented Dec. 30, 1913.
9 SHEETS—SHEET 9.

Witnesses:
Ida A. Eichorn.
Agnes M. Shea.

Inventor:
Eugene S. Hemmenway
by George A. Rockwell
Attorney.

UNITED STATES PATENT OFFICE.

EUGENE S HEMMENWAY, OF BOSTON, MASSACHUSETTS.

WAVE-MOTOR.

1,082,746.  Specification of Letters Patent.  Patented Dec. 30, 1913.

Application filed November 10, 1911. Serial No. 659,510.

*To all whom it may concern:*

Be it known that I, EUGENE S. HEMMENWAY, of Boston, in the county of Suffolk and State of Massachusetts, have invented a new and useful Wave-Motor, of which the following is a specification.

The main object of my invention is to take from the natural field, store and unite in the mechanical field natural forces that are transmitted in the form of electrical force, and my invention consists in providing a practical machine for doing this work.

A feature of my invention consists in utilizing the force of gravity in combination with waves in water, storing and uniting the forces.

Another feature of my invention consists in changing the force of water waves and the force of gravity acting on or against the machine into electromotive force.

Another feature consists in a structure oscillated in one direction by waves and in the other by gravity, said structure actuating mechanism within it for storing and uniting the forces causing the oscillation.

Other features of my invention as well as inventional details of construction will be pointed out below.

The form and the character of the anchor is determined by the nature of the bottom, the plurality of piles A shown being for a sand, clay or easily penetrated bottom.

One or more cables A' and A² and the swivel device S' hereinafter described in detail connect the anchor and the hull or skin A³. The hull A³ provides the buoyancy, resists the external strains, and supports and protects the various parts within it. It may be made of wood, wood and metal, or all metal and of any suitable size. The part of the exterior that in its movements receives the pressure of the surrounding water is symmetrical in form. The other part of the exterior forms a deck that may be provided with hatches, skylights, cleats, masts, manholes etc. as desired. The hull or skin may be made with compartments partitioned off in its interior for inclosing water for ballast, or air to render the whole non-sinkable.

At a point on the exterior of the hull at the bow is secured the collection of brackets and plates called the stem S which forms a support for and provides a connection with the swivel S' hereinafter described. Back of the stem, in the interior of the hull is shown the compartment B' which may be filled or partly filled with water to act as a ballast tank; the bottom of the compartment being the partition E. The compartment B' may be provided with one or more suitable outlets $c'$. These may be opened or closed much like the ordinary water faucet by turning the rod $d'$ which is operated from the exterior, so that when open water may flow in or out of the compartment depending upon whether the outlets $c'$ are above or below the water line.

The internal structure of the hull is designed to equalize and resist the strains, to furnish a secure foundation for the moving parts and be accessible. The beams $M^{101}$ and P furnish a strong support for the boxes P' that receive and retain the ends of the axle, which acts as a brace for the hull across the middle of the beams. The beams are secured at their ends to the hull structure by suitable knees, straps, brackets, etc., all designed to meet the maximum strain.

The hull is connected to the anchor cable by a swivel or universal joint in which S' is a yoke or ring connected to the stem of the float by pins $S^2$ and $S^3$ and connected to the body $S^6$ of the swivel by pins $S^4$ and $S^5$, said body being free to swing on pins $S^4$ and $S^5$. The chamber within $S^6$ between head $S^{101}$ and shoulder $d$ is adapted to fit the tube end of the electric cable hereinafter described. The portion $S^{102}$ makes the outside of a stuffing box. Member $S^7$ is hollow, is free to turn with relation to $S^6$ and has shoulder $d'$ to prevent pulling apart of the members, the electric cable passing through $S^6$ and $S^7$, with a free turning movement without disturbance of the contact as more fully described below. (See Figs. 18–21, Sheet 6.)

$S^7$ is threaded on the outside of its lower end to receive the stuffing box collar $S^8$, the hooks for anchoring cable $S^{11}$, the forcing collar $S^{10}$ and beveled on its inner edge to receive the split binding ring $S^9$.

The anchor cable hook $S^{11}$ may vary in design according to circumstances, and it is prevented from unscrewing by the pin $S^{12}$.

$S^{13}$ is a fender secured to the outer edges of the hooks and it also prevents the anchoring cable $A^2$ from slipping off.

The whole is a device that facilitates the anchoring of the machine, and protects the electric transmission cable's contact joints.

$S^{14}$ is a core made in two parts, filling the space between the upper portion of $S^6$ and the electric cable and held in position by pins $S^4$ and $S^5$ recesses being made to receive the pins. The primary function of $S^{14}$ is to keep out water from the interior of $S^6$.

Bolts $S^{15}$ and $S^{16}$ hold the yoke S' to pins $S^4$ and $S^5$.

Automatic locks with lock preventing attachments are secured to the hull structure $A^3$ on beams or brackets $P^2$ which are a part of $A^3$ and the function of the locks is to rigidly lock the hull $A^3$ to the wheels $A^{15}$ and $F^{14}$ only during certain movements of the hull $A^3$. The wheels $A^{15}$ and $F^{14}$ have, while unlocked, only the support of hull $A^3$ and are free to rotate during all movements of the hull $A^3$ except when the lock automatically joins them.

Figures 18, 19, 20, 21, 22:
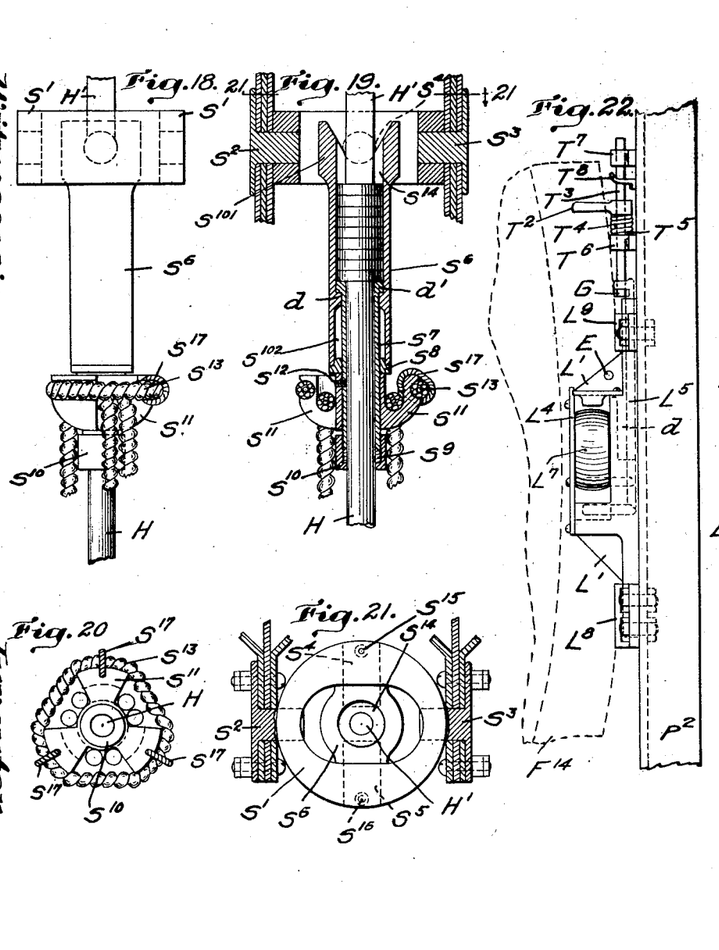
Fig. 18 is a fragmentary elevation of the swivel enlarged.
Fig. 19 is an enlarged sectional detail of the same.
Fig. 20 is a bottom plan of the same.
Fig. 21 is a section on line 21—21 of Fig. 19.
Fig. 22 is an enlarged side elevation of the locking mechanism.
Figure 23:
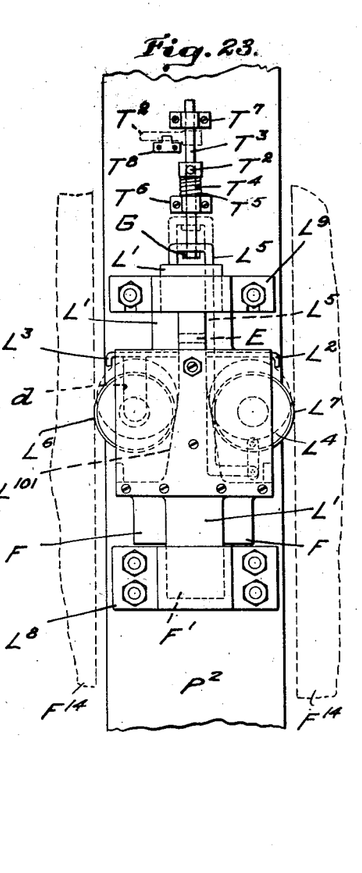
Fig. 23 is an enlarged front elevation of the same.

The lock preventing attachment or cut-out is shown on Sheet 6 Figs. 22 and 23. The base L' of each lock is attached by straps $L^8$ and $L^9$ to a beam or bracket $P^2$ secured in the hull and has a portion $L^{101}$ with the sloping walls, each of these walls forming with one wall of a recess $L^{81}$ in the wheel $A^{15}$ or $F^{14}$ a wedge shaped slot.

$L^2$ and $L^3$ are guiding covers suitably secured to base L' and their outer ends are shaped so that when the rings hereinafter described are raised far enough they will be moved away from the walls of the wheel. Back plate $L^4$ is secured to the base by screws and holds the rings $L^6$ and $L^7$ in position, each of the latter engaging a wall of the wheel and a sloping wall of $L^{101}$ to lock the wheel to the base and consequently to the structure or hull. I have shown rings although balls or other suitable devices might be used.

Figures 11, 37, 38:
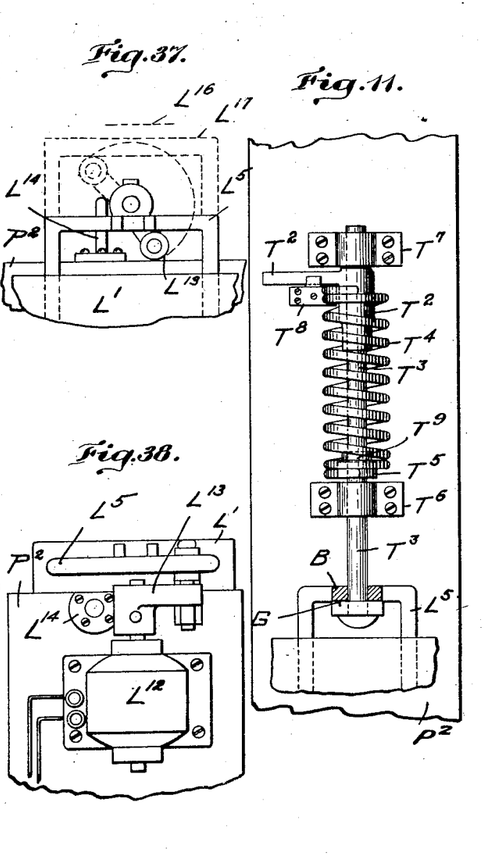
Figs. 37 and 38 (Sheet 4) show details of the lock cut-out device operated by an electric motor.

The cut out mechanism includes lifter $L^5$ bent as shown and mounted to move up and down in slot $l^{55}$ and groove $l^{56}$ on the base L'. The upper end of $L^5$ which is that portion which projects above the base is in Figs. 37 and 38, shown in connection with an electric motor $L^{12}$ with a lever arm $L^{13}$ secured to its axle. The motor is secured to the bracket or beam $P^2$ which is the part of the structure of the hull to which the lock is attached. This system consists of the motor and lever arm $L^{13}$, the support $P^2$ and the stud $L^{14}$. The stud $L^{14}$ limits the movement of the lever arm in one direction, and the support $P^2$ in the opposite direction. The movement of the lever arm $L^{13}$ actuated by an electric current lifts the lifting member $L^5$ to the maximum height shown by dotted line $L^{16}$ and allows it to drop down a little and rest upon it when it comes to rest against the stud $L^{14}$ gravity being the force that pulls $L^5$ from the extreme height to the position of rest shown by the dotted lines $L^{17}$ in Fig. 37. A reverse current sent through the motor turns the lever arm $L^{13}$ back through the path indicated by the dotted line. $L^5$ is again lifted to the maximum height and follows the end of the lever arm down, being influenced by gravity or the weight of itself and the two balls or rings in the wedge shape slot in the base L', the beam or bracket supporting the motor limiting the movement of the lever arms when turning in this the reverse direction. The electric current waits in this case until the lifter can be moved.

When the lifter is operated by hand the handle T² slides on the rod T³ and is connected by the spiral spring T⁴ with the collar T⁵ which also turns loosely on the rod T³, the latter having a shoulder G to engage shoulder B at the top of lifter L⁸. T³ is also provided with a ring T⁹ secured to it and thus T⁵ cannot move upward without moving T³ with it, but T², T⁴ and T⁵ may be easily turned on rod T³ which supports said members and which is itself held in position by brackets T⁶ and T⁷ which leaves holes through which T³ may move up and down. To the beam P² supporting the base L′, I attach hook T⁸ suitably located to engage handle T².

Figures 8, 12, 13, 14, 15, 16, 17:
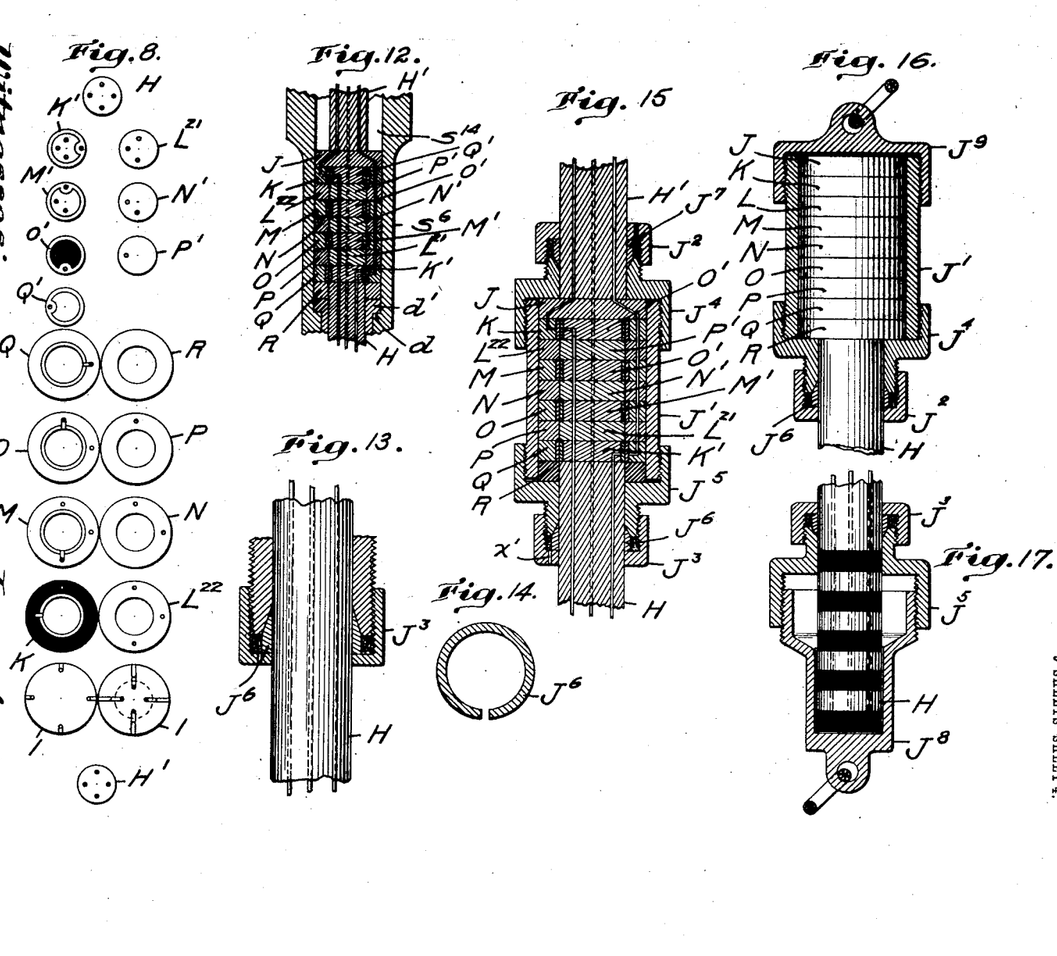
Fig. 8 shows details on a larger scale of parts of the electric cable joint hereinafter described.
Figs. 12 to 14 show details on a larger scale of the electric transmission cable joint.
Figs. 15 to 17 show details on a larger scale of the cable coupling.

The electric cable joint in the swivel member S⁶ (Fig. 19, Sheet 6) may be provided with any desired number of wires, four being shown, and to the end designed to lead to the collector are attached by solder or otherwise the copper and insulating rings shown making a tube into which the rod end fits. The wires at one end of the cable are bared or cleaned for a sufficient length, and bent out so as to pass through the slots in the insulating disk I, both faces of which are shown in Fig. 8. The wires are then straightened and passed through the holes in the insulating ring, K, one wire being cut off and soldered to the contact copper ring on the inner edge of K; the other wires passing through the holes in the insulated outside. The insulating ring L²², is slipped on the wires, and pressed close to K, the space, if any, between them being filled with a paste or insulating composition.

The rings, K, M, O, Q are made with an insulating material on the outside such as rubber and a copper ring on the inside, the copper rings having an inner circumference to fit on to a disk secured to the portion of the cable leading to the shore.

The ring M is treated the same as K, and the ring N follows, and so on to the end ring R. When all are assembled, the end of the cable H′ leading to the collector is a tube, the hole smooth and regular, with a copper ring and a rubber ring, alternately on the inside, and all rubber on the outside.

The disks K′, M′, O′ and Q′, making the rod end of the electric cable are disks with a center made of rubber, and the edge of copper, and fit into the rings of the tube while holes in the disks allow the wires of the cable to pass through, as shown in Fig. 8. In Fig. 8 I have shown one ring and one disk as of insulating material but they are all alike the insulation being omitted in the drawing for convenience. These parts are likely to be under water so there should be only holes for the wires to pass through, and all parts should fit closely.

In assembling the rod end of the cable the wires are cleaned and passed through holes in K′, one being cut off and soldered to the copper ring. The insulating disk L²¹ is next applied and so on, Q′ being in this case the last, the completed whole forming a rod, copper and rubber alternating and fitting closely inside of the tube end H of the cable.

The insulating and copper rings and disks are made thick enough to prevent any slight difference in thickness interfering with the transmission of the current.

Figure 1:
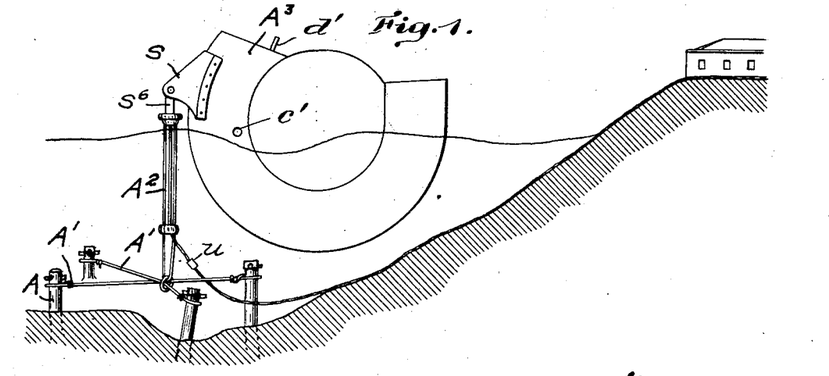
Figure 1 is a diagrammatic side elevation of a machine embodying my invention.

It may be desirable to uncouple the electric cable as at U (see Fig. 1) and in such case the cable ends are treated in the same manner as for the swivel, one end being a tube and the other a rod, both being inclosed in a water tight case.

J′ is the main tube the inside of which fits the outside of the tube on the electric cable this tube being like that above described and to each end of the tube I attach caps J⁴ and J⁵ fitting J′ and the cable.

J² and J³ are collars or cups with a hole for cable at one end and threaded to fit on to either J⁴ or J⁵ and provided with a small hole X′ to allow the cement to escape when being tightened.

J⁶ and J⁷ are rings split and shaped to allow them to be shrunk by being pressed into a bevel in the hole of J⁴ and J⁵ by screwing up J² or J³ and thus binding the cable H and preventing its being pulled apart. When the cable is uncoupled the ends may be protected by the caps J⁸ and J⁹ made to fit their respective ends of the cables. Caps J⁸ and J⁹ are made with a ring to which may be attached a rope or buoy. The screw joints should be leaded and the spaces inside filled with a filler to keep out the water.

Figures 24, 25, 26, 27, 28:
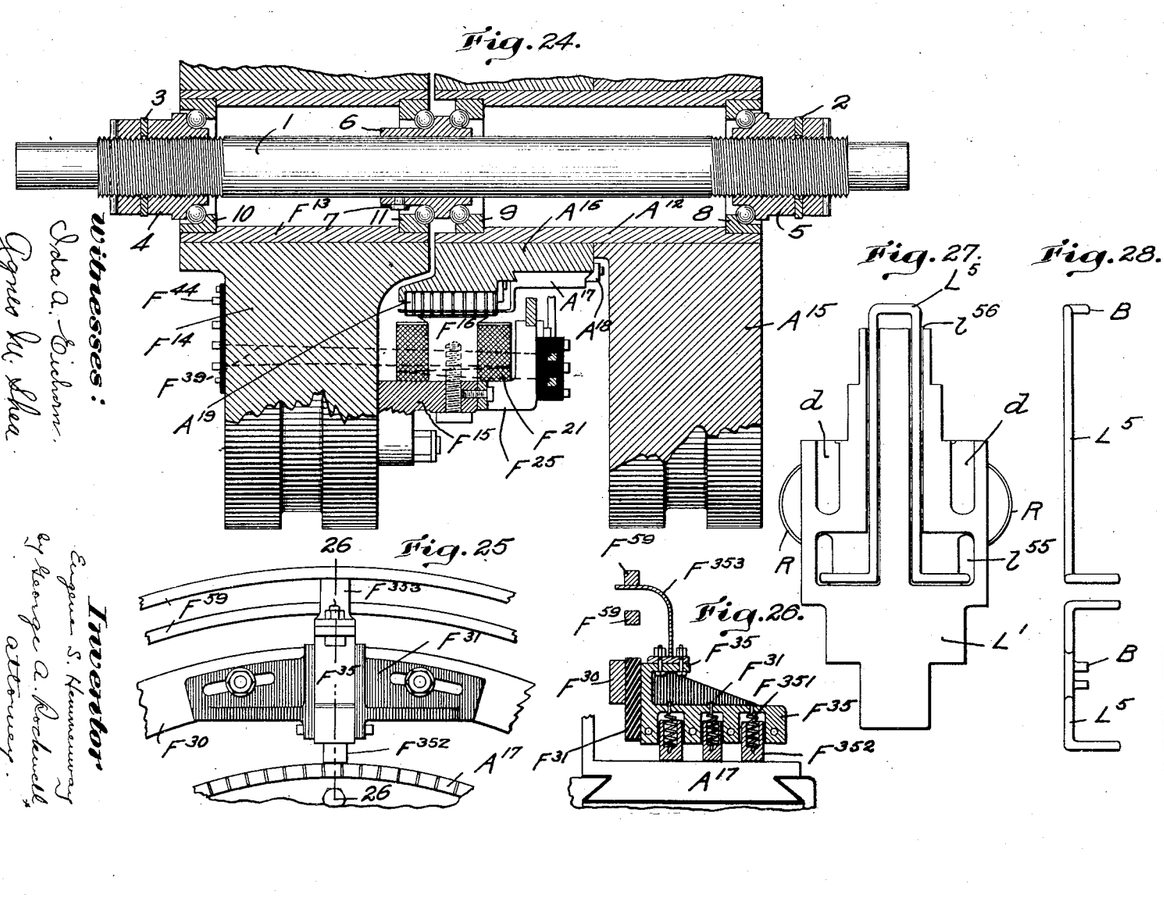
Fig. 24 is an elevation, partly in section, of a portion of one form of generator.
Fig. 25 is an elevation enlarged showing a portion of the connecting bars, the brush and commutator.
Fig. 26 is a section on line 26—26 of Fig. 25.
Figs. 27 and 28 are enlarged details of the lifting member of the cut-out mechanism.

In the type of generator shown in Fig. 24 axle 1 has its ends made to fit the boxes that secure it to the beams of the internal structure. 2 and 3 are washers. 4 and 5 are axle cups threaded to fit the axle; one end being a cup for balls and the other end face being formed like a nut. 6 is a collar pinned to the axle by pin 7 and cupped to receive balls at both edges. Bushing cups 8, 9, 10 and 11 are held in position by the shoulders on the bushings A¹² and F¹³ which after assembling are a part of the hub of the rotating wheels.

F¹⁴ is the base of the field. It is a fly wheel with the poles attached. It is trued to fit on its bushing, and may be made of one or more parts and rotates under one of the impulses of force above referred to. Field yoke F¹⁵ is attached to wheel F¹⁴ and carries pole F¹⁶. I may use any desired number of poles, four being present in this form of generator. F²¹ represents the coils around the poles. Bracket $F^{25}$ for the brushes is mounted on the yoke. In this design there are four brackets with two arms each making eight points of support for the adjustable ring hereinafter described. On the face of $F^{14}$ opposite to the yoke is the transmission rack $F^{44}$ hereinafter described.

$F^{28}$ (Figs. 33 and 34, Sheet 9) is a bracket adapted to support the worm gear $F^{29}$ (Fig. 34) and handle and motor $F^{291}$ by which the adjustable ring and brushes hereinafter described are adjusted to the proper position. The handle may be removed after the ring and brushes are in the proper position.

$F^{30}$ is an adjustable ring that supports the arms $F^{31}$ (Figs. 25, 26 and 34) for the brushes. It is secured by a plurality of arms in such a manner as to allow it to be turned by the worm $F^{29}$ engaging teeth as a part of its outside rim. It is held in position by the slots in the ends of the brackets. The ring supports the brush case holders so that the latter are movable.

$F^{31}$ is a brush case holder secured to the adjustable ring by two bolts in the slots shown so that the holder may be moved as desired. It is bolted to the brush case $F^{35}$. The brush case holder is made of hard rubber or other insulating material and supports the brush cases and forms the insulation of the brushes $F^{352}$ which are preferably made of copper or of copper and carbon. They are subject to centrifugal force and may be kept against the commutator $A^{16}$ by springs $F^{351}$ which also allow for mechanical inaccuracy. The brushes work inside the case and are held to the latter by the springs. The case $F^{35}$ is preferably made in two parts having a piece of copper $F^{353}$ bolted to its top and made to lead to the connecting bar $F^{59}$, the piece $F^{353}$ pressing against said bar to make contact although this pressure does not prevent movement of the adjustable ring or brushes (see Fig. 26).

Figure 32:
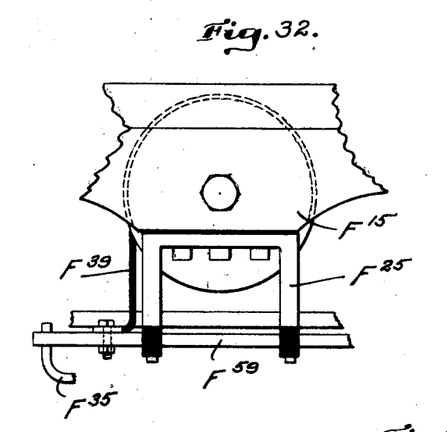
Fig. 32 is a detail view of one of the brackets.

To the connecting bars $F^{59}$ are attached the wires $F^{39}$ (see Figs. 24, 32, 36) leading to and connecting with the transmission rack. The wires may be suitably supported to the ring, brackets and base so that they can be adapted to length, size and other conditions, one leading by way of the coils around the poles and the other directly.

Figures 7, 35, 36:
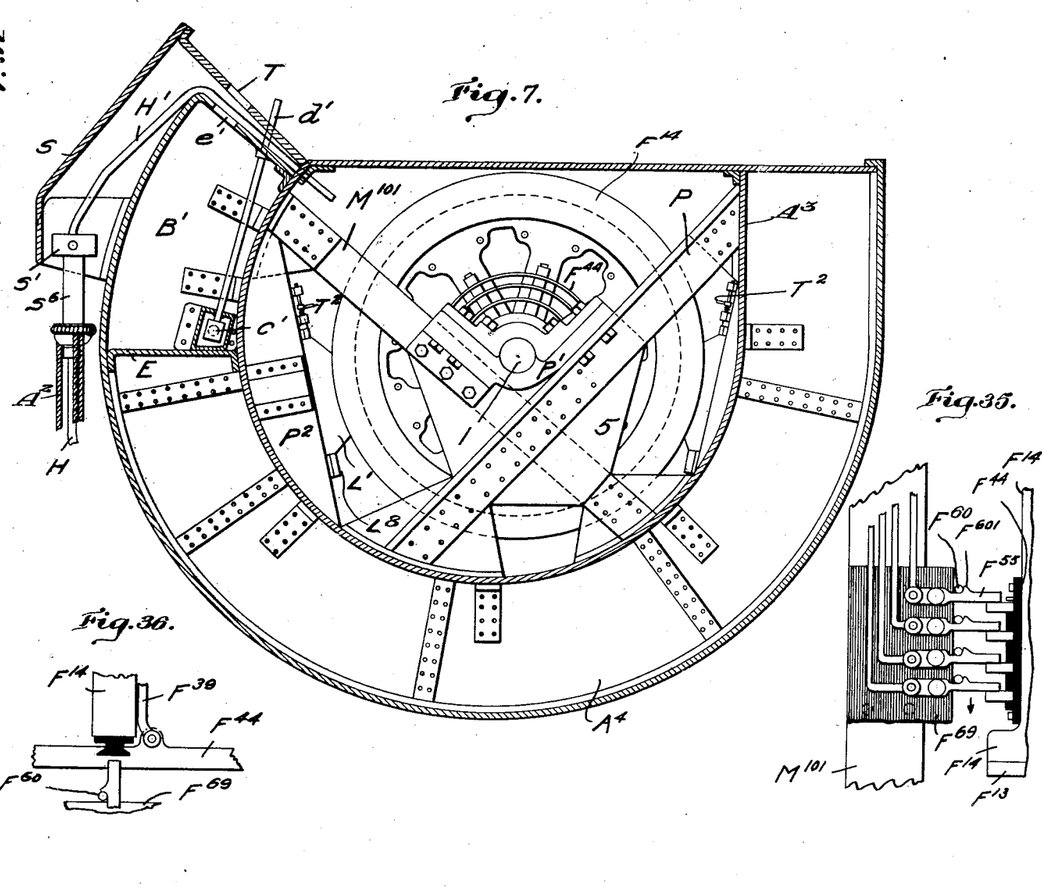
Fig. 7 is partly a central section and partly a side elevation of a machine embodying my invention.
Fig. 35 (Sheet 3) is a plan of brushes on internal structure in contact with rings in rack on field fly wheel.
Fig. 36 (Sheet 3) is an enlarged portion of ring rack showing insulator.

The connecting bars $F^{59}$ are made of copper, are insulated and held in position on the outer edge of the brackets by a hard rubber extension. Each bar is in contact with one set of brushes, the current passing from one bar around the poles to the transmission rack $F^{44}$, the other being directly connected to said rack by the wires $F^{39}$. The transmission rack $F^{44}$ in this design consists of rings made of copper. They are insulated by spokes made of insulating material and secured to wheel $F^{14}$ in such position that they are always in contact with brushes secured to the interior structure of the collector as shown in Fig. 35 so that the current is led away to the load and back to the machine.

From rack 44 the current is taken by brushes $F^{55}$ which are secured to insulating bed $F^{69}$ with provision for slightest movement with relation to the bed, the latter being preferably secured to a main beam near the axle box where there is the least movement. Each brush is held against its rack ring at one end and at the other is connected to a transmission cable or wire. Springs $F^{60}$ preferably of brass wire, are held in position in the bed so that the free end of each spring presses against its respective brush, shoulders $F^{601}$ on the brushes coöperating with the springs to hold the free ends of the brushes against the rack rings.

Wheel $A^{15}$ is the armature base secured to bushing $A^{12}$ by a key or other suitable means.

$A^{16}$ is a spider for the armature core and commutator segments and is suitably secured to the bushing.

$A^{17}$ represents the commutator segments secured to the spider by a retaining ring $A^{18}$ which is bolted to the spider.

$A^{19}$ is a laminated core for the armature.

Figure 6:
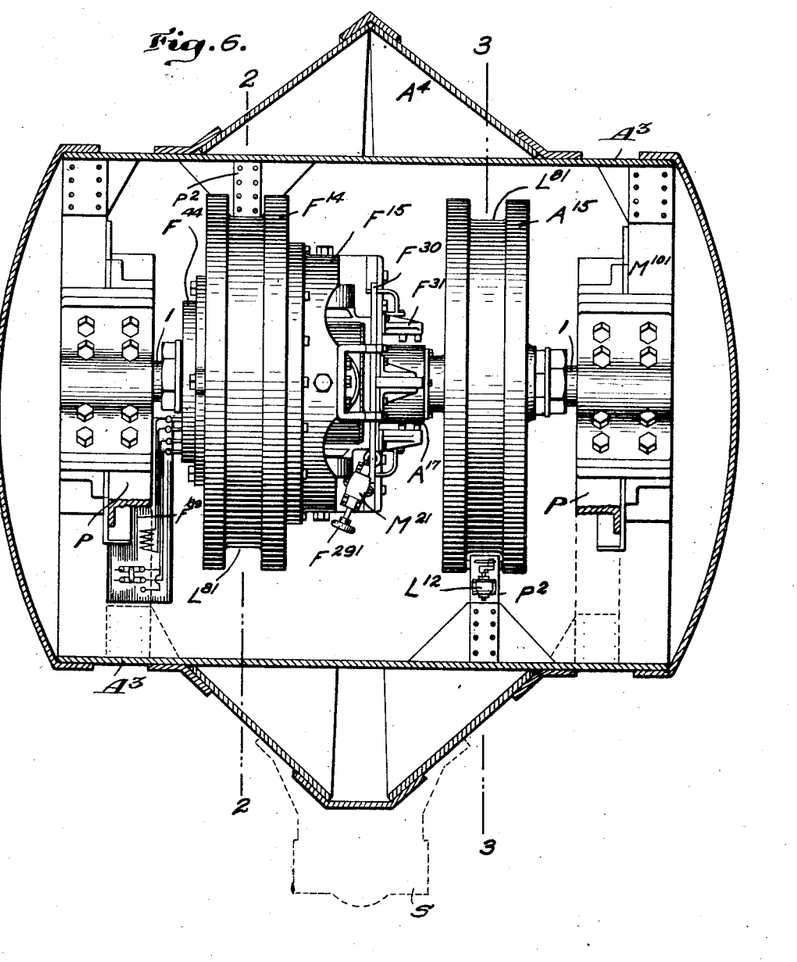
Fig. 6 is a plan of a machine embodying my invention, a part of the structure being removed.
Figure 33:
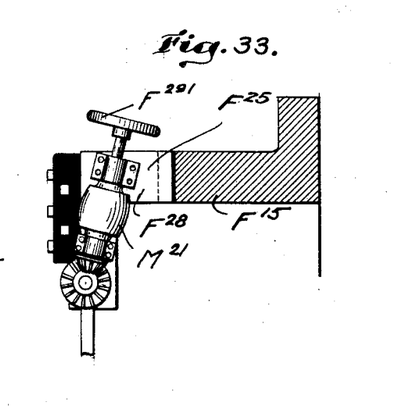
Fig. 33 is a detail view of the bracket carrying the worm gear system.
Figure 34:
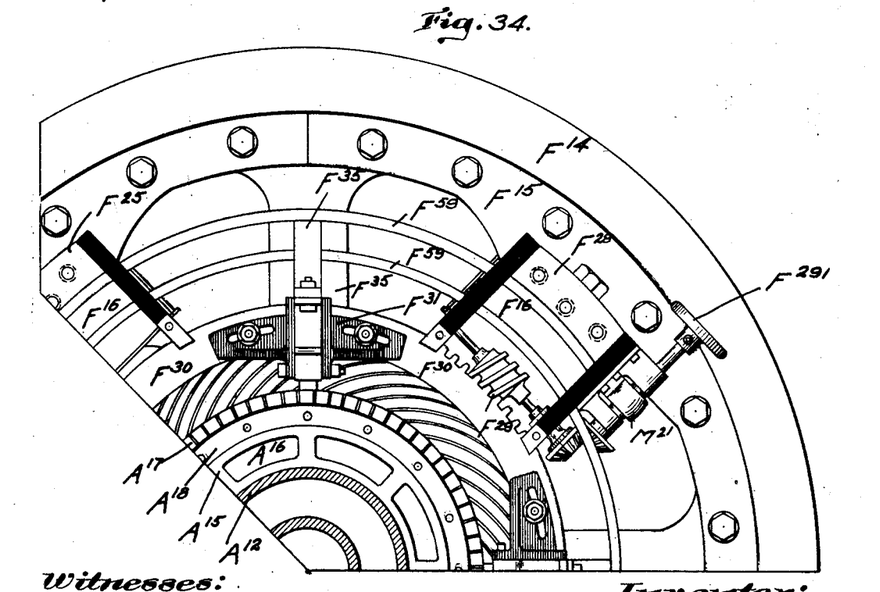
Fig. 34 is an end view of a portion of one form of generator.

The adjustable ring may be moved by electrical means and I therefore provide a motor $M^{21}$ as shown in Figs. 6, 33 and 34, the armature shaft being the shaft upon which is mounted handle $F^{291}$.

Figure 29:
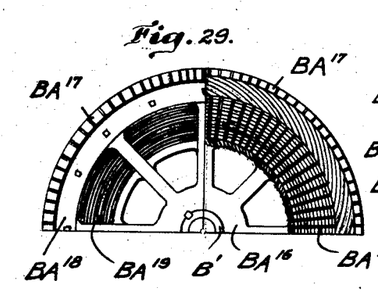
Fig. 29 shows at its left half a quarter side elevation of the armature of Fig. 31 looking in the direction of the arrow and at its right half an elevation of the same looking from the other side of the armature.
Figure 30:
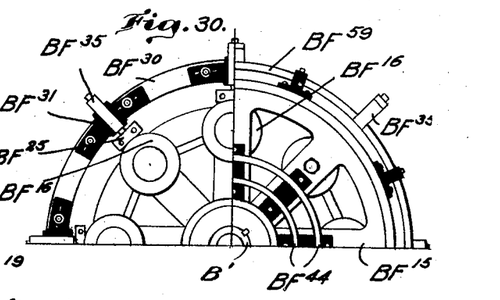
Fig. 30 shows at its right half a quarter side elevation of the field of Fig. 31 looking in the direction of the arrow and at its left half an elevation of the same looking from the other side of the wheel.
Figure 31:
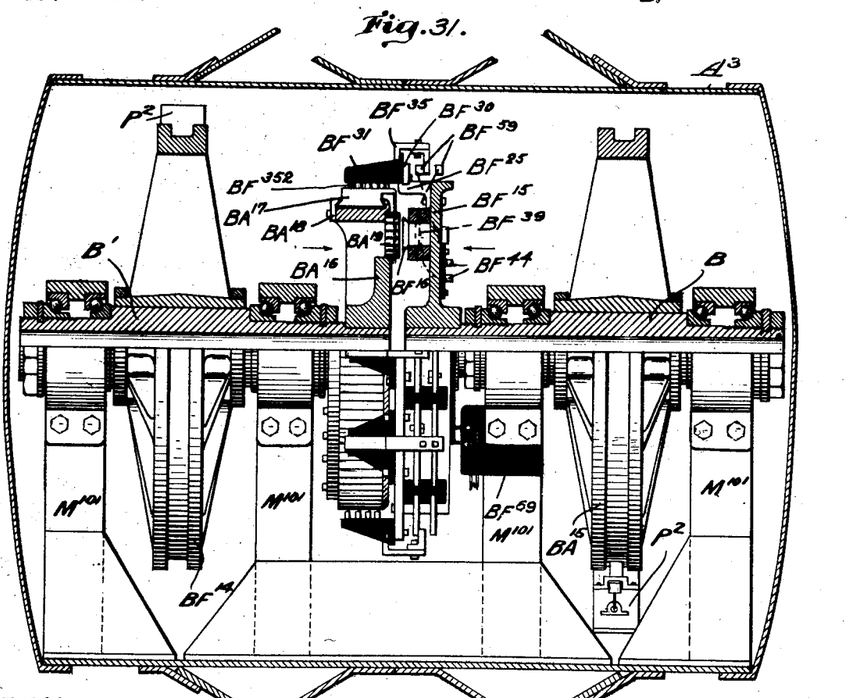
Fig. 31 shows another form of the internal mechanism, one half being in section and the other half in elevation.

The economical handling of different volumes of force demands different arrangements of the mechanical elements used in this machine. In Figs. 29 to 31 I have illustrated an arrangement wherein the flywheels and electro-generating items are separated, and also a different arrangement of the field and armature items of the electric generator. In this arrangement the axle B' is a part of the rotating member and turns on bearings secured to the internal structure, and the electro-generating members are secured to the axle. The same elements exist in both arrangements and the forces are stored and changed in the same manner and either electro generating arrangement may be used on or with either arrangement of axle, flywheel and internal beams. In the type of electro generating items shown in Figs. 29 to 31 B $F^{15}$ is the member supporting the field poles, B $F^{16}$ the poles, B $F^{25}$ the brackets, B $F^{59}$ the connecting bar, B $F^{44}$ the transmission rack, B $F^{30}$ the adjustable ring, B $F^{31}$ the brush case holder, B $F^{35}$ the brush case, B $F^{352}$ the brushes, and B $F^{39}$ the wires, these parts corresponding to the parts of the field in the first type described while B $A^{16}$ is the spider, B $A^{17}$ the commutator segments held by ring B $A^{18}$, and B $A^{19}$ the laminated core for the armature the plates being cut in strips and bent to form a ring. In Fig. 130

Figures 4, 5:
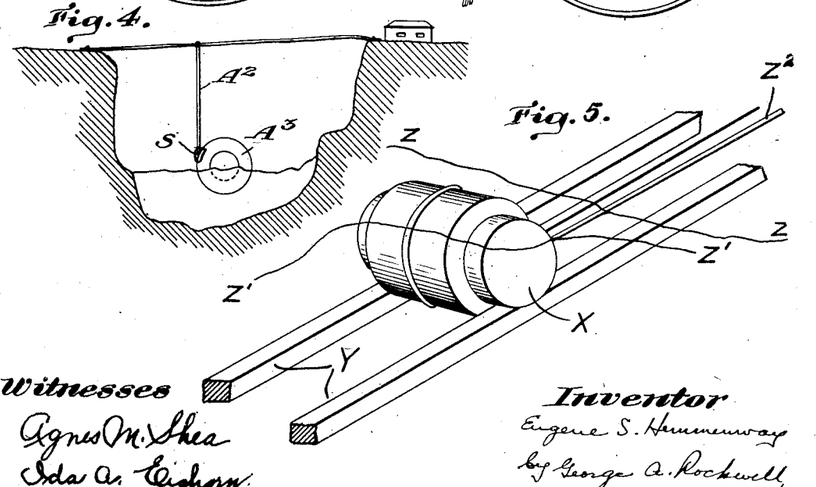
Fig. 4 is a diagrammatic view showing the anchoring cable extending upward.
Fig. 5 is a diagrammatic view of a modification.

5 is shown diagrammatically an application of the invention in which the machine X is rolled up an inclined track Y Y to high water mark Z Z by wave force, the top of the wave being indicated by Z' Z', and directly the wave has receded the machine is rolled down by gravity until its displacement brings it to rest or another wave forces it up. The interior mechanical arrangement may be practically the same as shown in the other hull, the difference being only in the location of the center of gravity, and number of locks, the latter being governed by the size of the machine.

In using my machine: I anchor it in a suitable place and connect the electric cable with the apparatus on the shore designed to receive the electric current. The universal joint and swivel connection allows the freedom of movement necessary to meet the varying conditions of tides, waves and winds. The shape of the exterior assists in converting forces acting upon the machine into rotary motion in a desired direction. A passing wave increases the depth of the surrounding water, and the machine is raised and turns from the position of Fig. 2 to that of Fig. 3 and the anchoring cable being taut the machine rolls on the axis of oscillation $o$. The shape of the external structure or hull is such that there is no resistance in the water to its turning except friction, the form of displaced water being the same in all working positions of the machine. An increase in the depth of the water is accompanied by a pressure on the outside of the machine at the center of pressure near Y so that the hull or external member turns on the axis of oscillation in the direction indicated by the arrow in Fig. 2. The wheel $F^{14}$ is during this upward and turning movement of the machine rigidly connected to the hull or collector by the locking device L and therefore rotates with the hull or collector. I use the word collector for member $A^3$ because it may be said to collect energy from the natural field and deliver it in the mechanical field in the form of rotary motion. When the pressure ceases or passes the machine drops and is brought back to approximately its former position through gravity, the center of which has been raised by the turning of the hull. At the beginning of this downward or second movement the lock L releases its grip on the rim of the wheel $F^{14}$ which by means of the momentum acquired during the first movement, continues and rotates in the direction indicated by the arrow $K^{10}$, Fig. 2. Thus kinetic energy or wave force in the surrounding water is brought into the mechanical field, converted into rotary motion, and stored in the mass of the rotating wheel.

Figure 2:
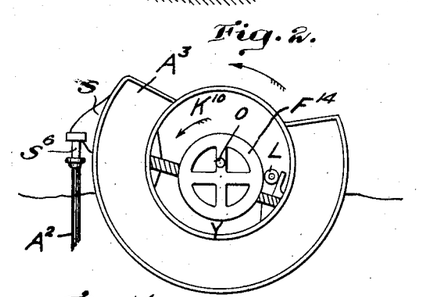
Fig. 2 is a diagrammatic view showing the interior in partial section on the line 2—2 of Fig. 6, the machine being at its lowest position.
Figure 3:
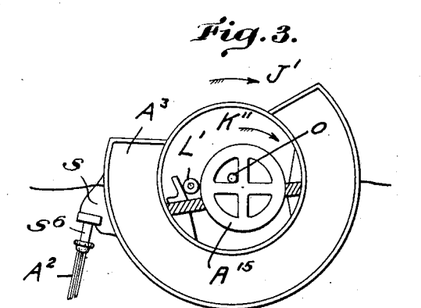
Fig. 3 is a diagrammatic view showing the interior in partial section on line 3—3 of Fig. 6, the machine being in its highest position.

Fig. 3 shows another cross section of the machine on line 3—3, Fig. 6 differing from Fig. 2 by showing the machine at the moment it is at the top of a wave. The axis of equilibrium is leaning. The upward pressure has passed, and the machine is about to be pulled down by the force of gravity. At this moment all pressures cease. The mass begins to drop and turns in the direction of arrow $K^{11}$.

The center of gravity of the system starts in its downward movement in a vertical line and acquires a momentum until the center of pressure acts, causing the center of gravity to swing in the arc of a circle in a direction indicated by the arrow J' Fig. 3, carrying, of course, the whole machine the structure or hull of which must turn on the axis at $O$. The water acts as an elastic cushion. The pressure increases as momentum is acquired until, aided by the anchoring cable $A^2$, the machine returns to approximately its former position. During this downward or second movement, the reverse of the first, the wheel $F^{14}$ is rigidly connected with the structure or hull by means of its lock L', rotary motion having been given to it, and the instant the rotating velocity of the structure at L' is less than that of the wheel's rim the lock L' ceases to engage, and the wheel continues its rotation in a direction indicated by the arrow $K^{11}$, a direction opposite to that of $K^{10}$. Thus potential energy in the machine's mass becomes kinetic energy and is brought into the mechanical field, converted into rotary motion, and stored in the rotating wheel. During the potential impulse the first wheel has continued its rotation, and after a wave has passed, both wheels are rotating. Some of the collected energy is utilized and united by the generator and a portion is stored in the weight in the wheel's rim.

The weight allowed by the displacement of the collector is sufficient for the material used in its own construction, and to allow sufficient mass to be put in the wheels to store energy from one impulse to another.

Two impulses are always received from one wave. The first is that of the machine rising and turning with the passing wave, the highest velocity attained being communicated to the rim of the engaged or locked wheel. The second is that of the machine dropping and turning after the wave has passed, the energy being handled in the same way, the peak of the rotary movement being communicated to the rim of the engaged or locked wheel. The utilized force impulses are converted into rotary motion by the hull structure or collector. A portion of each impulse is independently stored. The forces are united into electro-motive force by the generator. The energy is converted into electricity by one wheel carrying or being connected with the field and the other wheel carrying or being connected with the armature of an electric generator. The two rotate in opposite directions. The generated current is transmitted to a point on terra firma by means provided as explained. The energy of the gravity impulse is exerted at the center of gravity. Under all conditions the collector offers an elastic resistance meeting greater force with greater resistance.

The increased wave force results too in increased gravity force, a wave lifting the machine higher, and giving greater distance for it to drop resulting in an increased velocity in the gravity impulse both forces acting upon a mass great enough to resist sudden acceleration. The collector, in its first movement of rising, transforms wave motion into rotary motion. The falling motion which begins directly the rising ceases, is accompanied by a rotary motion caused by the center of gravity of the mass in its effort to get into its natural position, the shape of the exterior of the collector being an important factor in both movements.

To make the collector rise the wave must rise around it until the pressure overcomes the resistance of the load. The wave rises fast when the load point is passed the pressure increases and the machine begins to rise, and in rising is compelled to turn or roll by the anchorage at W. In the falling W does not influence the mass until the gravity impulse is over, or passed. The electric joint is free to turn within the swivel body and the electric cable may be uncoupled at any suitable point such as U. In such case I apply caps $J^8$ and $J^9$, each of which has a ring to which a rope or buoy may be attached.

Figure 9:
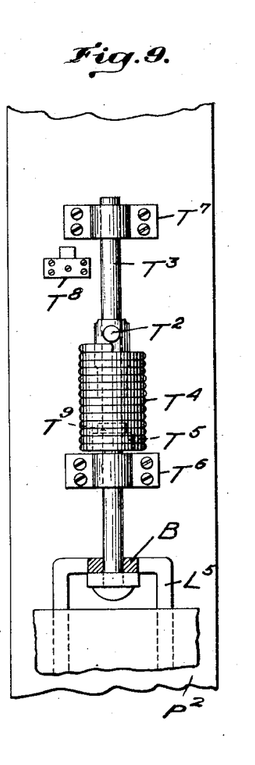
Figs. 9 to 11 are details showing different positions of the cut-out mechanism.
Figure 10:
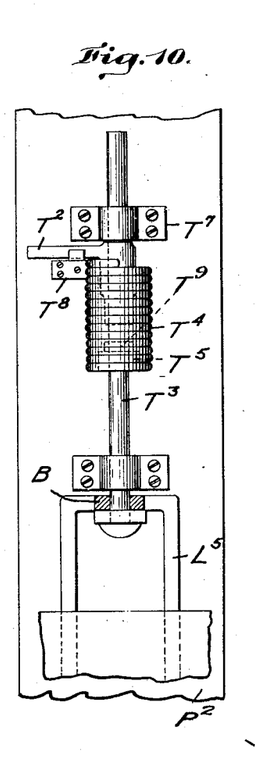

During the normal operation of my machine the rings or balls of each lock are in position to make conjunction with their adjacent wheels but if it is desired to prevent such conjunction and to provide a definite disjunction either of the two methods shown may be used. In one the handle $T^2$ is lifted a little above the top of $T^8$, and turned around and rested upon that member, as shown in Fig. 23 by the arrow H and the dotted lines $T^2$. If the conjunction exists the handle $T^2$ may be placed on $T^8$ as shown in Fig. 11, and the spring $T^4$ is elongated and remains so until the conjunction ceases when the spring closes lifting the rod $T^3$ and the lifter $L^5$ and the rings $L^6$ and $L^7$, this position being shown in Fig. 10. If the conjunction does not exist at the time the handle is moved the whole moves from the position in Fig. 9 to that of Fig. 10 and as the spring is adjusted to the weights of the parts it must lift.

In the electrical device for providing the disjunction the current waits until it overcomes the resistance. Theoretically it would seem that in order that the fly wheels and generator be rotated by the oscillating movements of the collector the latter and the fly wheels and generator should when turning simultaneously both be on the same axis or center. It has been proved, however, that the generator receives rotating impulses from the oscillating movements of the collector when the center or axis of the former is placed away from the axis of the collector and this fact allows the weight of the fly wheels and generator to be used in placing the center of gravity of the machine so that when the machine drops from the top of a wave to the hollow the collector is turned on its axis by the center of gravity of the whole system and a rotary impulse is given to the mechanism designed to utilize the force. The mechanical arrangement of the interior of my machine permits the use of an alternating type of electrical generator if desired, the transmission items between the generator and the shore being practically identical.

Among the advantages of my machine are its simplicity, its great efficiency, the ease of assembling the parts and the ready accessibility to all the parts.

I do not claim the above described electrical joint broadly as such nor the above described generator broadly as such in this application as I intend to make these features the subject of separate applications.

I do not claim in this application the electrical joint shown as such, nor the means for moving the brushes with relation to the base during the movement of the latter as such, nor the rotary field combined with the rotary armature as such as I intend to make them the subject of another application or applications.

What I claim is:—

1. A machine of the character described comprising an anchor; a hull connected to the anchor and adapted to be moved in one direction by wave force and in the opposite direction by gravity; and two oppositely-rotatable coöperating members, one being actuated by said hull but only when the latter is moved in the first-named direction and the other being actuated by said hull but only when the latter is moved in said opposite direction.

2. A machine of the character described comprising an anchor; a hull connected to the anchor and adapted to be moved in one direction by wave force and in the opposite direction by gravity; one rotatable member started in its rotation by the movement of the hull in the first-mentioned direction but free to continue its rotation during the movement of the hull in said opposite direction and being unaffected in its rotation by the last-mentioned movement; and a second member coöperating with the first to produce electrical energy and being rotatable in a direction opposite to that of the first member, said second member being started in its rotation by the movement of the hull under the influence of gravity but free to continue its rotation during the movement of the hull in the direction opposite thereto and being unaffected in its rotation by the last-mentioned movement.

3. A machine of the character described comprising an anchor; a hull connected to the anchor and adapted to be oscillated; and means within the hull, and actuated thereby for producing electrical energy; and means for transmitting said energy from the hull to the shore during said oscillation.

4. A machine of the character described comprising a member adapted to oscillate in one direction under the influence of wave force and in the other direction under the influence of gravity; and another member carried by the first member and started in its movement by the oscillation of the first member under the influence of the wave force but free to continue its movement with relation to the first member during the oscillation of the latter under the influence of gravity.

5. A machine of the character described comprising a buoyant member adapted to oscillate in one direction under the influence of wave force and in the other direction under the influence of gravity; two continuously movable members coöperating to transform energy, said members being carried by, and actuated by the two oscillating movements of, the buoyant member, and means for transmitting the transformed energy.

6. A machine of the character described comprising an anchor; a buoyant member connected to the anchor and adapted to oscillate in one direction under the influence of wave force and in the other direction under the influence of gravity; and means carried by the buoyant member, and actuated by the buoyant member, for storing energy.

7. A machine of the character described comprising a hull adapted to oscillate in one direction under the influence of wave force and in the other direction under the influence of gravity; means actuated by the hull during its first-mentioned oscillation to store energy; and means actuated by the second-mentioned oscillation to store energy.

8. A machine of the character described comprising an anchor; a hull connected to the anchor and adapted to oscillate in one direction under the influence of wave force and in the other direction under the influence of gravity; and means within the hull and actuated by the combined oscillating movements of the hull for storing energy.

9. A wave motor comprising an anchored buoyant member adapted to be oscillated in one direction under the influence of wave force and in the opposite direction under the influence of gravity; and means carried by said member and actuated thereby to convert said wave force into rotary energy; and means to convert said rotary energy into electromotive force.

10. A machine of the character described comprising an anchor; a hull connected to the anchor and adapted to oscillate in one direction under the influence of wave force and in the other direction under the influence of gravity; and means within the hull, and actuated by the combined oscillating movements of the hull for producing electro-motive force.

11. A machine of the character described comprising an anchor; a hull connected to the anchor and adapted to oscillate in one direction under the influence of wave force and in the other direction under the influence of gravity; means within the hull, and actuated by the combined oscillating movements of the hull, for producing electro-motive force; and means for transmitting said force.

12. A machine of the character described comprising an anchor; a hull connected to the anchor and adapted to oscillate in one direction under the influence of wave force and in the other direction under the influence of gravity; a member actuated by the hull during its oscillation under the influence of wave force and having movement relative to the hull during the other oscillation; and a second member actuated by the hull during its oscillation under the influence of gravity and having movement relative to the hull during the other oscillation, said members coöperating to produce electrical energy.

13. A machine of the character described comprising a member adapted to reciprocate moving in one direction under the influence of wave force and in the opposite direction under the influence of gravity; a generator within said member and comprising two rotary members, one carrying an electrical field and the other an armature coöperating with said field, said rotary members having movement in opposite directions and one actuated by said member during its movement under the influence of the wave force and the other actuated by said member during its movement under the influence of gravity.

14. A machine of the character described comprising a hull; means within and actuated by the movements of the hull for generating electromotive force; and means to transmit said force from the hull to the shore.

15. A machine of the character described comprising a hull; an electrical generator carried by the hull; an anchor; and means connecting the anchor and hull including a tubular joint; and means to transmit electro-motive force from the generator to a point at a distance from the hull, said means passing through, and free to turn within, said joint.

16. A machine of the character described comprising a hull adapted to oscillate in one direction under the influence of wave force and in the other direction under the influence of gravity; a member carried by the hull and actuated thereby to store force; and means to automatically lock said member and said hull together during one movement of oscillation.

17. A machine of the character described comprising a hull adapted to oscillate in one direction under the influence of wave force and in the other direction under the influence of gravity; a member carried by the hull and actuated thereby to store force; and automatic means to lock said member and said hull together and to unlock them.

18. A machine of the character described comprising a hull adapted to oscillate in one direction under the influence of wave force and in the other direction under the influence of gravity; a member carried by the hull and actuated thereby to store force; means to lock said hull and said member together; and electrically operated means to unlock said hull and said member.

19. A machine of the character described comprising a hull member adapted to oscillate in one direction under the influence of wave force and in the other direction under the influence of gravity; another member actuated thereby to store force; and means to lock said members together comprising a wedge in contact with one member and working in a wedge shaped slot in the other member.

20. A machine of the character described comprising an anchor; a hull connected to the anchor and adapted to oscillate in one direction under the influence of wave force and in the other direction under the influence of gravity; a rotary member mounted within said hull and actuated by the hull to store force; and means to automatically lock said member to said hull during one movement of oscillation and to leave said member and hull free to move relatively during the other movement of oscillation.

21. A machine of the character described comprising a hull adapted to oscillate in one direction under the influence of wave force and in the other direction under the influence of gravity; a member carried by the hull and actuated thereby to store force; automatic means normally acting to lock and unlock said hull and said member; and means to prevent action of said automatic means.

22. A machine of the character described comprising a hull member adapted to oscillate in one direction under the influence of wave force and in the other direction under the influence of gravity; a member carried by the hull and actuated thereto to store force; a wedge in contact with one of said members and normally working in a wedge shaped slot in the other member, and a lifter to lift said wedge out of operative position.

23. A machine of the character described comprising an anchor; a hull connected to the anchor and adapted to oscillate in one direction under the influence of wave force and in the other direction under the influence of gravity; said hull having a compartment for water to act as balance, the compartment being so located that the center of gravity of the water in the compartment is non-coincident with the center of gravity of the machine.

24. A machine of the character described comprising an anchor; a hull connected to the anchor and adapted to oscillate in one direction under the influence of wave force and in the other direction under the influence of gravity; said hull having a compartment for water to act as balance, the compartment being so located that the center of gravity of the water in the compartment is non-coincident with the center of gravity of the machine; and means to control the flow of water in and out of the compartment.

25. A wave motor comprising a hull adapted to roll in one direction under the influence of wave force and in the other direction under the influence of gravity and having its submerged parts symmetrically constructed so as to displace the same volume of water in all working positions; and means carried by said hull and movable with relation thereto for storing energy.

26. A machine of the character described comprising an anchor; a hull connected to the anchor; and two members carried by the hull, having continuous movement with relation to each other and coöperating to produce electricity.

27. A machine of the character described comprising an anchor; a hull connected to the anchor; and two members rotatable within the hull, having continuous movement with relation to each other, and coöperating to produce electricity said members being actuated by the hull.

28. A machine of the character described comprising an anchor; a hull connected to the anchor and adapted to be oscillated; and two members rotatable in opposite directions within the hull and having their axes of rotation coincident, said members having continuous movement with relation to each other and coöperating to produce electricity and being actuated by the oscillation of the hull.

29. A machine of the character described comprising an anchor; a hull connected to the anchor and adapted to be moved in one direction by wave force and in the other direction by gravity; and two members within the hull and rotatable independently of each other, one being rotated by the hull when the latter is moved by the wave force, and the other being rotated by the hull when the latter is moved by gravity, said members having continuous relative movement and coöperating to produce electricity.

30. A machine of the character described comprising an anchor; a hull connected to the anchor and adapted to be oscillated; and two members rotatable within the hull, coöperating to produce electrical energy in themselves and having continuous movement with relation to each other, said members being actuated by movements of the hull; and means for transmitting said energy.

31. A machine of the character described comprising an anchor; a hull connected to the anchor and adapted to be moved in one direction by wave force and in the other direction by gravity; and two members within the hull and rotatable simultaneously independently of each other, one being rotated by the hull when the latter is moved by the wave force and the other being rotated by the hull when the latter is moved by gravity said members having continuous relative movement and coöperating to produce electricity.

32. A wave motor comprising a hull adapted to oscillate in one direction under the influence of wave force and in the other direction under the influence of gravity; and a generator carried by the hull and actuated directly by the movements of the hull to generate electromotive force.

33. A machine of the character described comprising an anchor; a hull connected near one end to the anchor; and two members carried by the hull, having continuous movement with relation to each other and coöperating to produce electricity.

34. A machine of the character described comprising an anchor; a hull connected to the anchor and adapted to oscillate in one direction under the influence of wave force and in the other direction under the influence of gravity; means within the hull and actuated by the combined oscillating movements of the hull for producing electricity; and means for transmitting said force to the shore during the oscillating movements.

35. A machine of the character described comprising an anchored buoyant member containing and actuating two members axially mounted to rotate in opposite directions, said members coöperating to generate an electric current.

36. A machine of the character described comprising an anchored buoyant member containing and actuating two members axially mounted to rotate in opposite directions, said members coöperating to generate an electric current, and means to transmit the current to the shore.

37. A machine of the character described comprising an anchored hull adapted to be oscillated and containing and actuating two members axially mounted to rotate in opposite directions, one member being started and assisted in its rotation by the hull when moved by force in the surrounding water and free to continue its rotation during the other oscillating movement of the hull, the other axially mounted member coöperating with the first to produce electricity and being started and assisted in its rotation by the hull when moved by the force of gravity acting on the whole system in combination with the pressure of the surrounding water, said second member being free to continue its rotation during the other oscillating movement of the hull.

38. A machine of the character described comprising an anchor; a hull connected to the anchor and adapted to be oscillated, one movement of the oscillation being caused by force in the supporting water, and directed by the anchor, the reverse movement of the oscillation being caused by gravity acting upon the whole machine combined with pressure of the supporting water upon the hull; and coöperating means mounted within the hull and rotated in opposite directions by movements of the hull to produce electricity.

39. A machine of the character described comprising a buoyant hull; two oppositely rotating members contained in, and actuated by, the hull and coöperating to produce electricity in themselves; an anchor connected to the hull; and a cable connected to the hull to transmit said electricity to the shore, said cable permitting freedom of movement of the hull without twisting of the cable itself.

40. A machine of the character described comprising an actuating member containing and supporting two actuated members, axially mounted to rotate independently and in opposite directions and coöperating to generate an electric current; means that automatically rigidly lock the actuating member and each of the actuated members during certain movements of the actuating member and allow the actuated members to rotate with relation to the actuating member during other movements of the actuating member; and electrically controlled means for preventing or allowing the locking of the two during the said certain movements.

41. A machine of the character described comprising an anchor; a hull connected to the anchor and adapted to oscillate in one direction under the influence of wave force and in the other direction under the influence of gravity; and means carried by the hull and actuated by the combined oscillating movements of the hull for producing electromotive force.

EUGENE S. HEMMENWAY.

Witnesses:
GEORGE N. GODDARD,
GEORGE A. ROCKWELL.

Copies of this patent may be obtained for five cents each, by addressing the "Commissioner of Patents, Washington, D. C."